United States Patent [19]

Uchiyama et al.

[11] Patent Number: 5,333,029
[45] Date of Patent: Jul. 26, 1994

[54] CAMERA CAPABLE OF DETECTING EYE-GAZE

[75] Inventors: Shigeyuki Uchiyama, Tokyo; Tadao Takagi, Yokohama; Daisuke Saya, Urayasu; Yuji Katano, Kawasaki; Shigemasa Sato, Chiba; Toshimi Watanabe, Machida, all of Japan

[73] Assignee: Nikon Corporation, Tokyo, Japan

[21] Appl. No.: 773,726

[22] Filed: Oct. 9, 1991

[30] Foreign Application Priority Data

Oct. 12, 1990 [JP] Japan ............... 2-272174
Oct. 25, 1990 [JP] Japan ............... 2-287723
Oct. 29, 1990 [JP] Japan ............... 2-291434

[51] Int. Cl.$^5$ ............... G03B 7/08; G03B 3/00; G03B 13/02
[52] U.S. Cl. ............... 354/410; 354/400; 354/219; 354/432
[58] Field of Search ............... 354/400, 62, 219, 432, 354/402, 410

[56] References Cited

U.S. PATENT DOCUMENTS

| | | | |
|---|---|---|---|
| 4,574,314 | 3/1986 | Weinblatt | 354/400 X |
| 4,836,670 | 6/1989 | Hutchinson | 354/62 X |
| 5,036,347 | 7/1991 | Tsunekawa et al. | 354/400 |
| 5,245,381 | 9/1993 | Takagi et al. | 354/219 X |

FOREIGN PATENT DOCUMENTS 63-94232 4/1988 Japan.
1-241511 9/1989 Japan.
1-274736 11/1989 Japan.
2-5 1/1990 Japan.

Primary Examiner—Michael L. Gellner
Assistant Examiner—Jae N. Noh
Attorney, Agent, or Firm—Shapiro and Shapiro

[57] ABSTRACT

A camera includes a photo-taking lens, an automatic focus adjusting device for effecting the automatic focus adjustment of the photo-taking lens, an eye-gaze detecting device for detecting the photographer's eye-gaze position in a finder field corresponding to a photographing picture plane, and producing an eye-gaze detection signal corresponding to the eye-gaze position, a focus adjustment signal producing device for outputting a plurality of focus adjustment signals corresponding to a plurality of detection areas in the photographing picture plane, and a control signal producing device for producing a control signal for controlling the automatic focus adjusting means, on the basis of the eye-gaze detection signal and the focus adjustment signals. The control signal producing device produces the control signal on the basis of the plurality of focus adjustment signals corresponding to the plurality of detection areas when the eye-gaze position indicated by the eye-gaze detection signal is at a position between the plurality of detection areas.

6 Claims, 12 Drawing Sheets

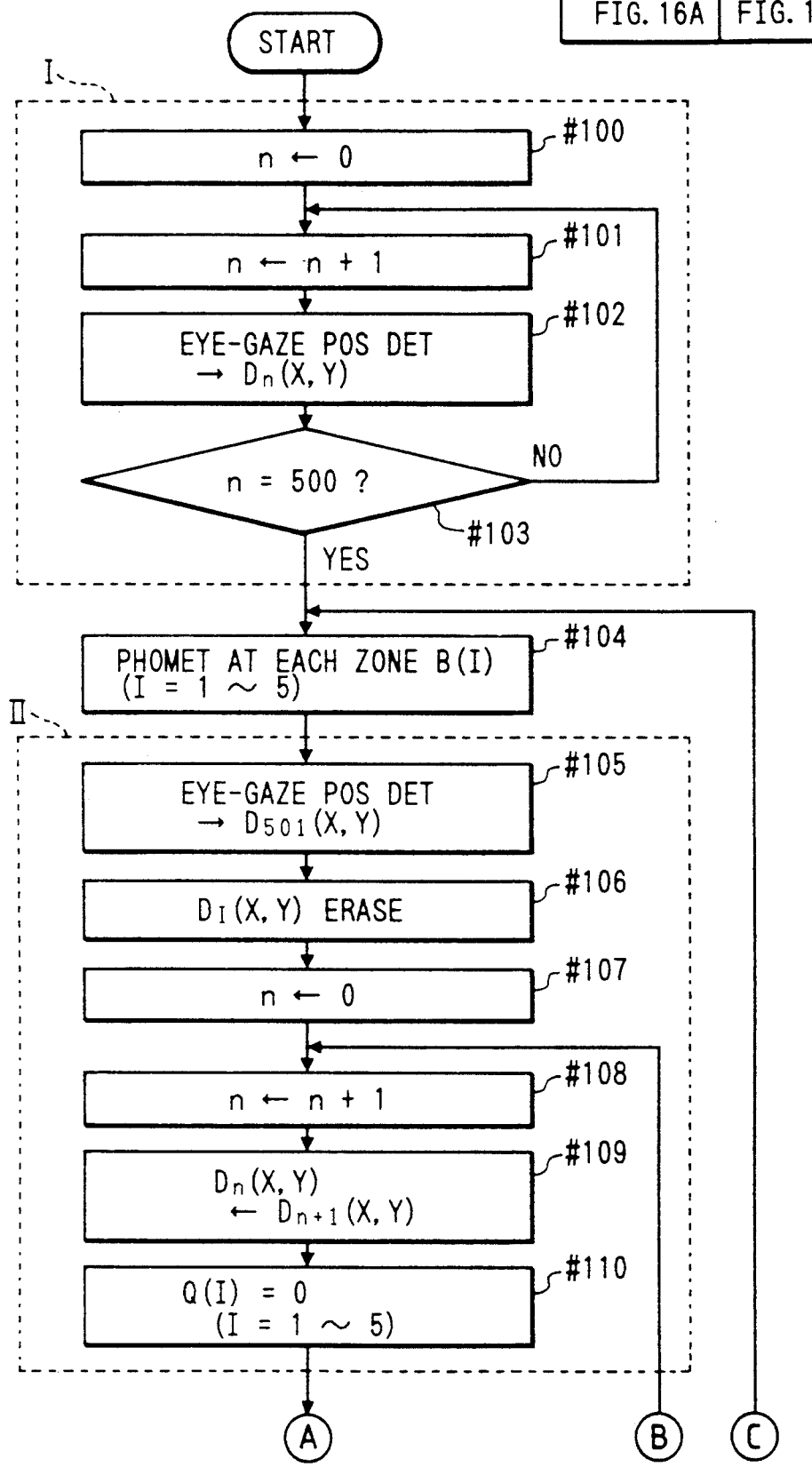

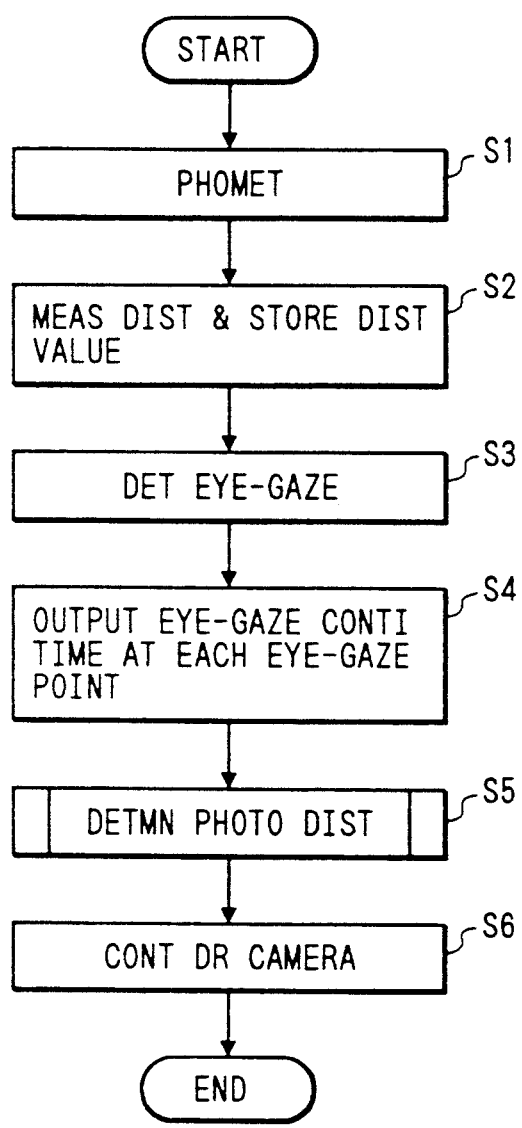

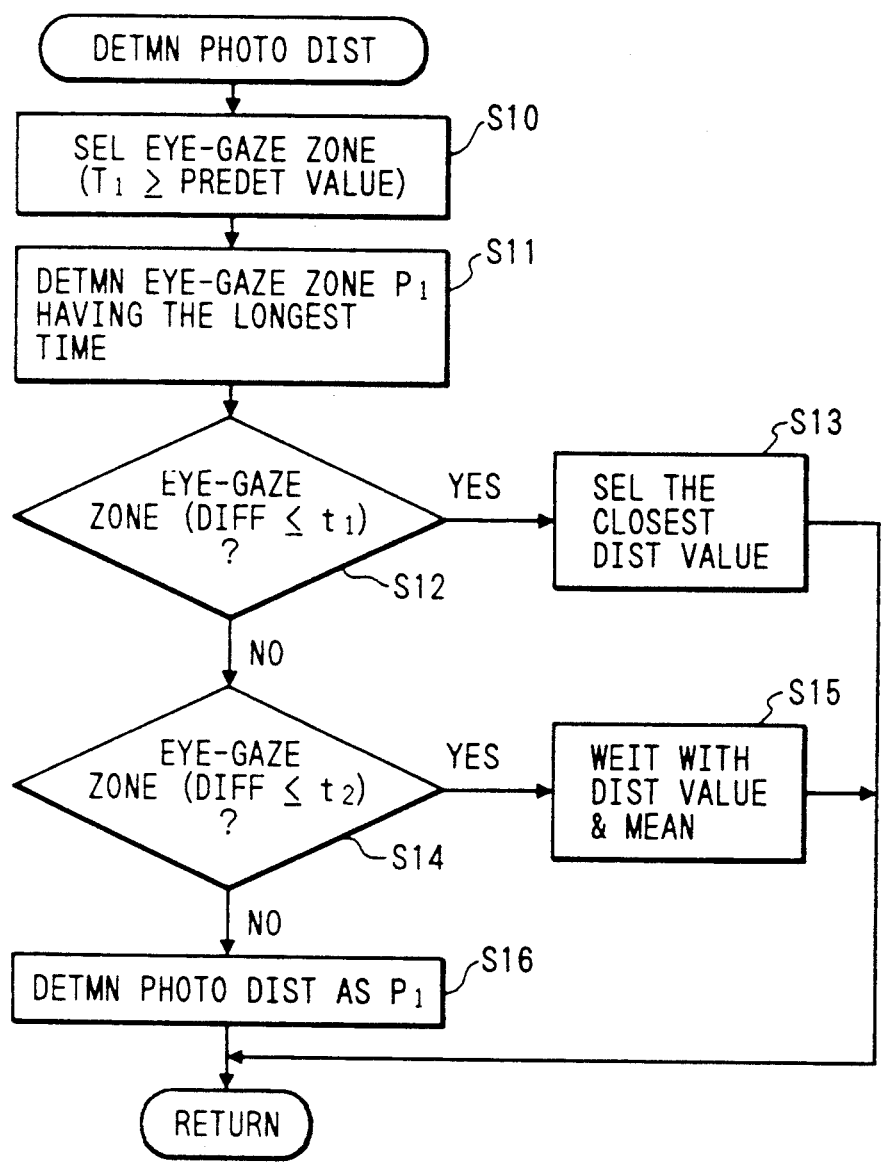

CAMERA CAPABLE OF DETECTING EYE-GAZE

BACKGROUND OF THE INVENTION

1. Field of the Invention

This invention relates to a camera provided with eye-gaze detecting means suitable for use, for example, in a camera such as a still camera or a video movie camera endowed with the function of detecting an eye-gaze position in the photographing picture plane (of various positions in the photographing plane, the position of the portion the user is gazing at) and controlling the auto focusing operation of a photo-taking lens or controlling the exposure of film or an image pickup element.

2. Related Background Art

As cameras of this kind, there are known cameras in which what portion in the photographing picture plane the photographer should recognize as the main object is determined on the basis of the result of the eye-gaze detection and a photo-taking lens is driven by the use of an information value representative of the focus detection state corresponding to the object in the determined portion to thereby effect so-called auto focusing. There are also known cameras in which automatic exposure control is effected by the use of an information value representative of the luminance of an object in the portion recognized as the main object on the basis of the eye-gaze detection (such cameras are disclosed, for example, in Japanese Laid-Open Patent Application No. 63-94232, Japanese Laid-Open Patent Application No. 1-241511 and Japanese Laid-Open Patent Application No. 2-5).

However, in a camera wherein auto focusing is effected on the basis of the result of the eye-gaze detection, there may arise a problem as will be described below.

Suppose a case where, as shown in FIG. 7 of the accompanying drawings, a plurality of focus detection areas 1-3 are set in the photographing picture plane 10. Also assume that when the photographer gazes at between the focus detection area 1 and the focus detection area 2, the focus detection area nearer to the eye-gaze point is selected and a photo-taking lens is driven on the basis of an information value representative of the focus detection state in that area. Assuming that in the case of such a camera, the photographer's eye-gaze point is near the intermediate point a between the focus detection area 1 and the focus detection area 2 and, as shown in FIG. 8 of the accompanying drawings, the object distance D1 in the area 1 and the object distance D2 in the area 2 differ greatly from each other, the selected focus detection area will change over from the area 1 to the area 2 or from the area 2 to the area 1 simply if the eye-gaze point slightly moves unconsciously to right and left near the point a (the gaze of the human eye moves involuntarily even if one is gazing at one point). Each time the changeover takes place, the photo-taking lens is reciprocally driven between driven positions R1 and R2 as shown in FIG. 9 of the accompanying drawings, and this results in the waste of electric power. This is a problem which will likewise arise when the vicinity of the intermediate point b between the focus detection areas 2 and 3 is gazed at. Also, if the eye-gaze point is moved from the left end to the right end of the picture plane or conversely, the selected focus detection area will change over when the eye-gaze passes the point a and the point b and therefore, in conformity therewith, the driving of the photo-taking lens will take place suddenly. Thus, in the case of a camera for photographing moving images like a video movie camera, the object distance focused in a photographed moving image varies suddenly and therefore, that moving image becomes very unnatural one.

On the other hand, in a camera wherein automatic exposure is effected on the basis of the result of the eye-gaze detection, there may arise, for example, a problem as will be described below.

Assume that where as shown in FIG. 10 of the accompanying drawings, a plurality of photometry areas 11-13 are set in the photographing picture plane 10, a photometry area corresponding to the photographer's eye-gaze point is selected and exposure is determined on the basis of the luminance information in that area. In the case of such a camera, assuming that the photographer's eye-gaze point is near the intermediate point a between the photometry area 11 and the photometry area 12 and, as shown in FIG. 11 of the accompanying drawings, the object luminance B1 in the area 11 and the object luminance B2 in the area 12 differ greatly from each other, the selected photometry area will change over from the area 11 to the area 12 or from the area 12 to the area 11 simply if the eye-gaze point slightly moves unconsciously to right and left near the point a. Accordingly, simply if in spite of having gazed at a single object present near the eye-gaze point a, the photographer slightly moves the eye-gaze point, the exposure amount as the result of automatic exposure control may greatly vary to E1 and E2 as shown in FIG. 12 of the accompanying drawings. This is a problem which will likewise arise when the vicinity of the intermediate point b between the photometry areas 12 and 13 is gazed at. Also, if the eye-gaze point is moved from the left end to the right end of the picture plane or conversely, the selected photometry area will change over when the eye-gaze passes the point a and the point b and therefore, in conformity therewith, the exposure amount controlled will vary suddenly. Thus, in the case of a camera for photographing moving images like a video movie camera, the brightness of photographed moving images varies suddenly and unnaturally.

SUMMARY OF THE INVENTION

It is the object of the present invention to provide a camera in which more adequate automatic focus adjustment and automatic exposure control can be effected on the basis of eye-gaze detection with a result that better images can be obtained.

BRIEF DESCRIPTION OF THE DRAWINGS

FIG. 19 is a flow chart showing the photographing operation of the FIG. 17 embodiment.

FIG. 20 is a flow chart showing an example of the subroutine of FIG. 19.

DESCRIPTION OF THE PREFERRED EMBODIMENTS

Figure 1:
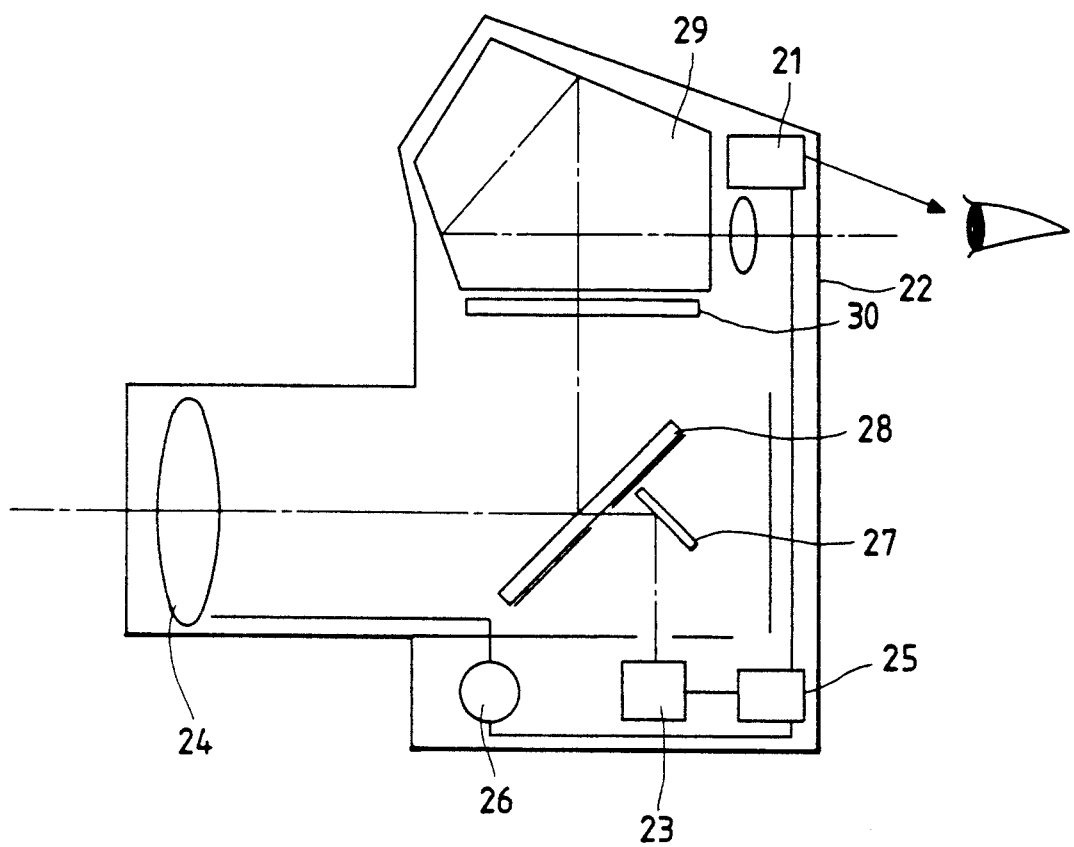
FIG. 1 is a schematic view showing the internal structure of a camera provided with eye-gaze detecting means according to an embodiment of the present invention.

FIG. 1 shows the internal structure of a camera according to an embodiment of the present invention. This camera effects automatic focus adjustment on the basis of the result of eye-gaze detection.

In FIG. 1, the reference numeral 21 designates an eye-gaze detecting device for detecting the photographer's eye-gaze point in the photographing picture plane 10. The eye-gaze detecting device 21 is contained in a housing 22. The reference numeral 23 denotes a focus detecting apparatus for the camera. The focus detecting apparatus 23 is provided below the eye-gaze detecting device 21 and is contained in the housing 22.

This focus detecting apparatus has contained therein a first calculating device (not shown) for calculating information values (information values relating to the object distances in a plurality of areas 1-3 in the photographing picture plane 10) D1-D3 representative of the focus detection states of a photo-taking lens 24 corresponding to the plurality of focus detection areas 1-3 (FIG. 7) in the photographing picture plane 10. The reference numeral 25 designates a control device for controlling the amount of driving of the photo-taking lens 24 by a mean information value D calculated by itself. The control device 25 is connected to the focus detecting apparatus 23 and the eye-gaze detecting device 21. The mean information value D is calculated in the following manner by a second calculating device (not shown) contained in the control device 25. That is, the second calculating device determines the weighting coefficients k1-k3 of the focus detection areas 1-3 on the basis of the photographer's eye-gaze point by the characteristic lines k1-k3 of the coefficients shown in FIG. 2, and calculates the mean information value D by an operation expression $D = (k1 \times D1 + k2 \times D2 + k3 \times D3) \div (k1 + k2 + k3)$.

The reference numeral 26 denotes a motor for moving the photo-taking lens 24 in the direction of the optical axis thereof, and the reference numeral 27 designates a sub-mirror for directing a light beam transmitted through a half-mirror 28 to the focus detecting apparatus 23. The reference numeral 29 denotes a pentaprism, and the reference numeral 30 designates a finder screen.

Description will now be made of an example of the calculation for finding the mean information value D from the information values D1-D3.

Figure 2:
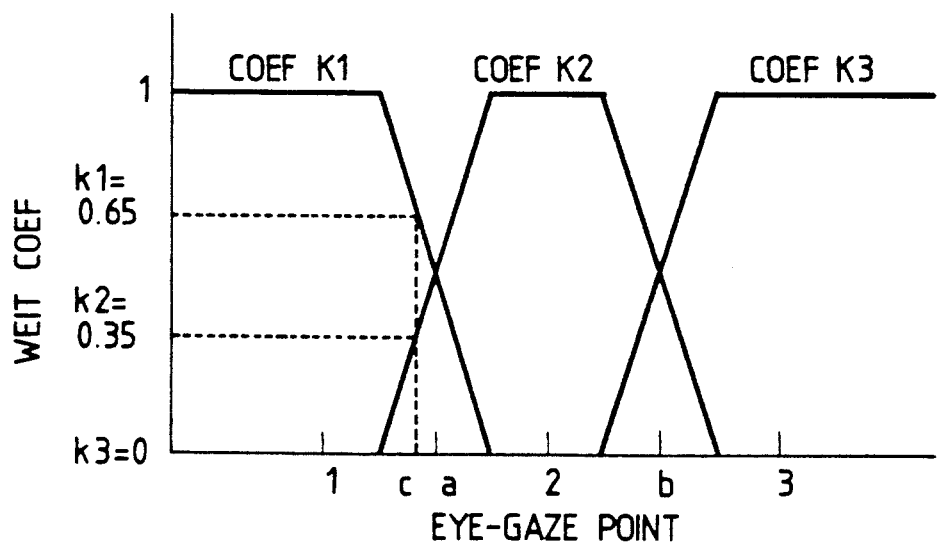
FIG. 2 is a graph showing the relation between the eye-gaze point by the camera of the FIG. 1 embodiment and weighting coefficients.
Figure 8:
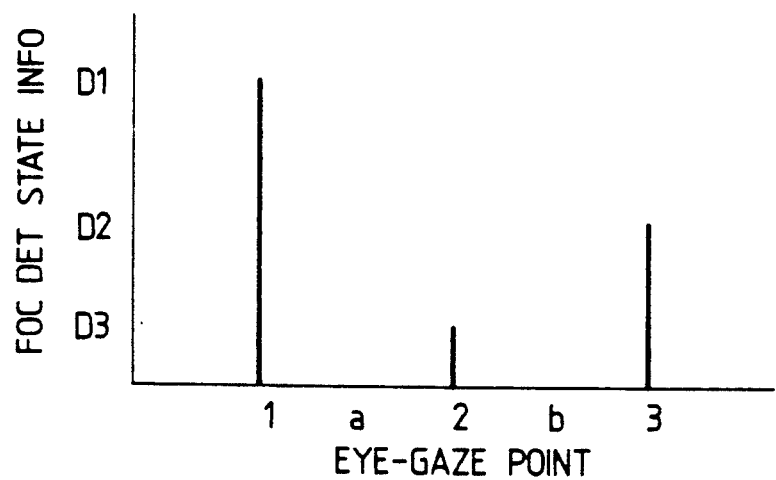
FIG. 8 is a graph showing the relation between the two particular eye-gaze points shown in FIG. 7 and focus detection state information (object distance information).
Figure 9:
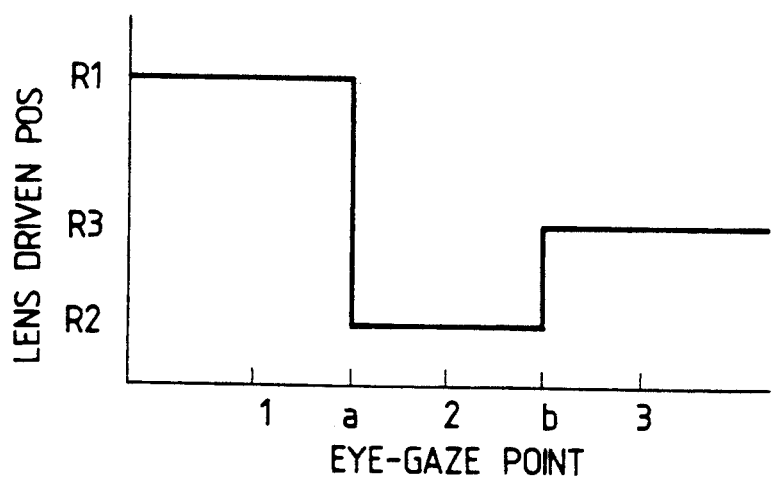
FIG. 9 is a graph showing the relation between the two particular eye-gaze points shown in FIG. 7 and the lens driven position.

Assuming for example that the eye-gaze point is at a point c indicated in the abscissa of FIG. 2, when the weighting coefficients k1-k3 for this eye-gaze point c are determined in accordance with the coefficient characteristic lines of FIG. 2, they are 0.65, 0.35 and 0, respectively, as indicated in the ordinate of FIG. 2. Assuming that the information values D1-D3 representative of the focus detection states in the focus detection areas 1-3 are values greatly differing from one another as shown in FIG. 8, the mean information value D is as follows:

$$D = (0.65 \times D1 + 0.35 \times D2 + 0 \times D3) \div (0.65 + 0.35 + 0)$$
$$= 0.65 \times D1 + 0.35 \times D2$$

Figure 3:
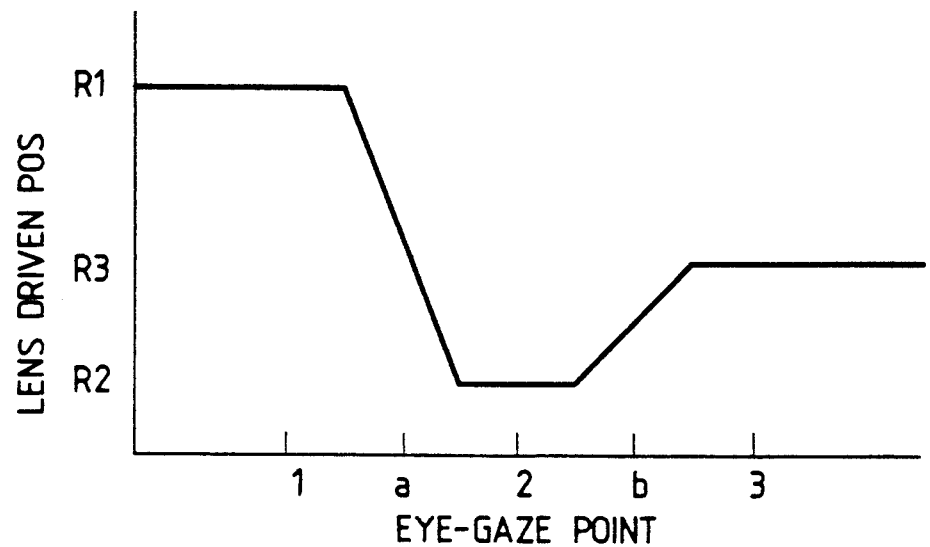
FIG. 3 is a graph showing the relation between the eye-gaze point and the lens driven position.

When the amount of driving of the photo-taking lens 24 is controlled on the basis of the mean information value D obtained in this manner, the change in the lens position in the intermediate area of the focus detection areas becomes smooth as shown in FIG. 3 even if the eye-gaze point changes delicately.

While the present embodiment has been shown with respect to a case where there are three focus detection areas 1-3, the present invention is not restricted thereto. There may be two focus detection areas, or four or more focus detection areas. Where there are four or more focus detection areas, the lens driving will be effected more smoothly. In such case, the mean information value D can be calculated from an operation expression $D = (k1 \times D1 + k2 \times D2 + \ldots + kn \times Dn) \div (k1 + k2 + \ldots + kn)$, where information values representative of the focus adjusted states of the photo-taking lens corresponding to the focus detection areas 1-n in the photographing picture plane are D1, D2, ..., Dn, and the weighting coefficients of the focus detection areas 1-n are k1, k2, ..., kn.

The above-mentioned information values D1-D3 indicative of the focus detection states need not always correspond strictly to the object distances. Even information values (information from which can be known a rough standard of the amount of driving of the photo-taking lens necessary for focus adjustment and the direction of driving thereof) indicative of the amount and direction (front focus or rear focus) of defocus of the object image by the photo-taking lens can be applied to the present embodiment. In such case, if the detection of the information values and the calculation of the mean information value are repetitively effected while the photo-taking lens is driven, proper focus adjustment will be possible.

While in the above-described embodiment, the automatic focus adjustment of the photo-taking lens has been effected in accordance with the mean information value D, the present invention is not restricted thereto, but design may be made such that automatic zooming is effected in the following manner on the basis of the mean information value D. That is, a motor for zooming is controlled so that the greater becomes the distance corresponding to the mean information value D, the more the photo-taking lens may be zoomed up, and and so that the smaller becomes said distance, the more the photo-taking lens may be zoomed down, whereby the size of the object in the photographing picture plane can be made constant irrespective of the object distance.

Description will now be made of a camera according to another embodiment of the present invention. This camera effects automatic exposure control on the basis of the result of eye-gaze detection.

Figure 4:
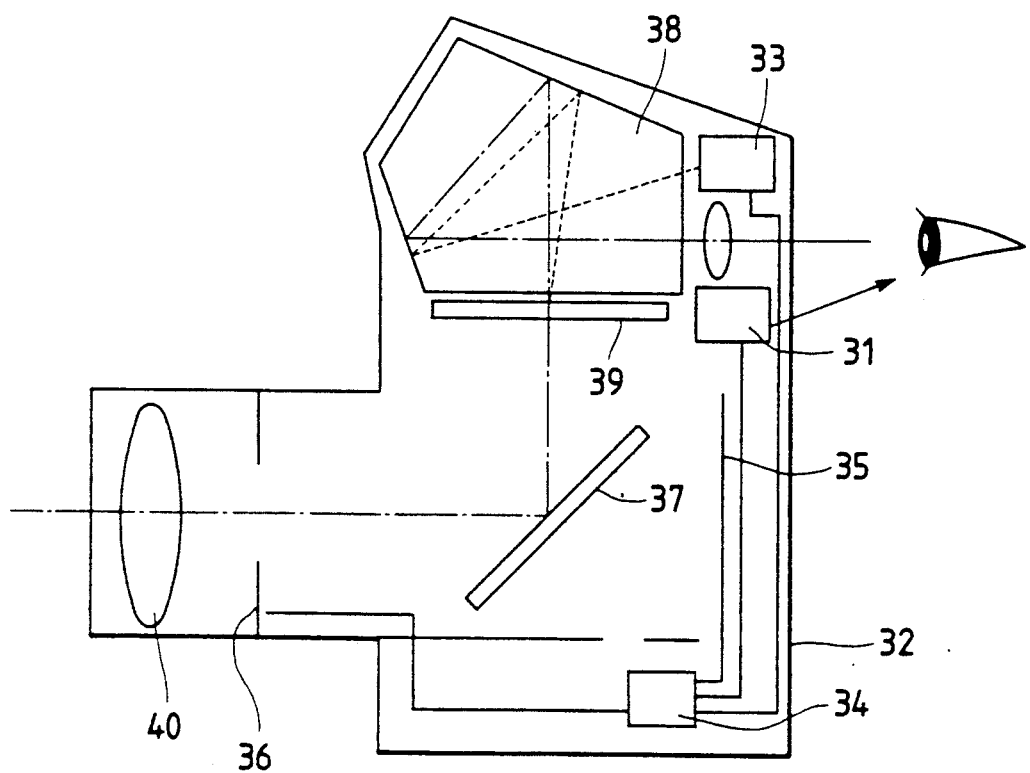
FIG. 4 is a schematic view showing the internal structure of a camera provided with eye-gaze detecting means according to another embodiment of the present invention.

FIG. 4 is a schematic view showing the internal structure of the camera according to this embodiment. In FIG. 4, the reference numeral 31 designates an eye-gaze detecting device for detecting the photographer's eye-gaze point in the photographing picture plane 10. The eye-gaze detecting device 31 is contained in a housing 32. The reference numeral 33 denotes a photometry device for the camera. The photometry device 33 is provided above the eye-gaze detecting device 31 and is contained in the housing 32.

Figure 10:
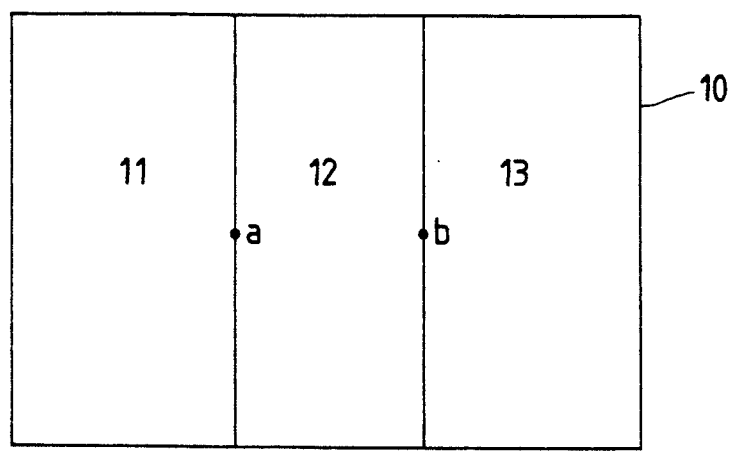
FIG. 10 shows the positions of photometry areas and two particular eye-gaze points in the photographing picture plane.

This photometry device 33 has contained therein a first calculating device (not shown) for calculating information values B1-B3 representative of object luminances in a plurality of photometry areas 11-13 (FIG. 10) in the photographing picture plane 10. The reference numeral 34 designates a control device for controlling the shutter speed of a shutter 35 and the amount of aperture of a stop 36 on the basis of a mean information value B calculated by itself. The control device 34 is connected to the photometry device 33 and the eye-gaze detecting device 31. The mean information value B is calculated in the following manner by a second calculating device (not shown) contained in the control device 34. That is, the second calculating device determines the weighting coefficients k11-k13 of the photometry areas 11-13 on the basis of the photographer's eye-gaze point by coefficient characteristic lines K11-k13 shown in FIG. 5, and calculates the mean information value B by an operation expression B=(K11×B1+k12×B2+k13×B3)÷(k11+k12+k13).

The reference numeral 37 denotes a mirror, the reference numeral 38 designates a pentaprism, the reference numeral 39 denotes a finder screen, and the reference numeral 40 designates a photo-taking lens.

Description will now be made of an example of the calculation for finding the mean information value B from the information values B1-B3.

Figure 5:
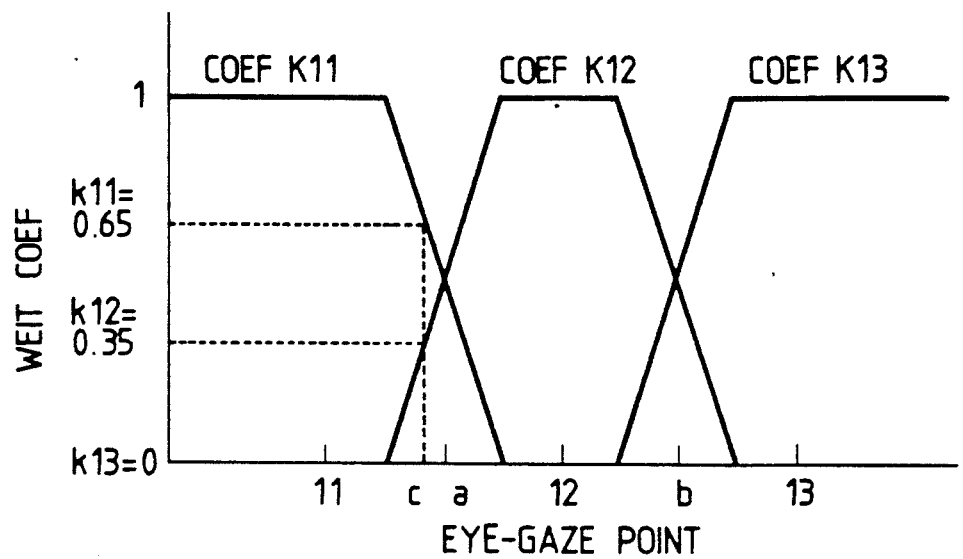
FIG. 5 is a graph showing the relation between the eye-gaze point by the camera of the FIG. 4 embodiment and weighting coefficients.
Figure 11:
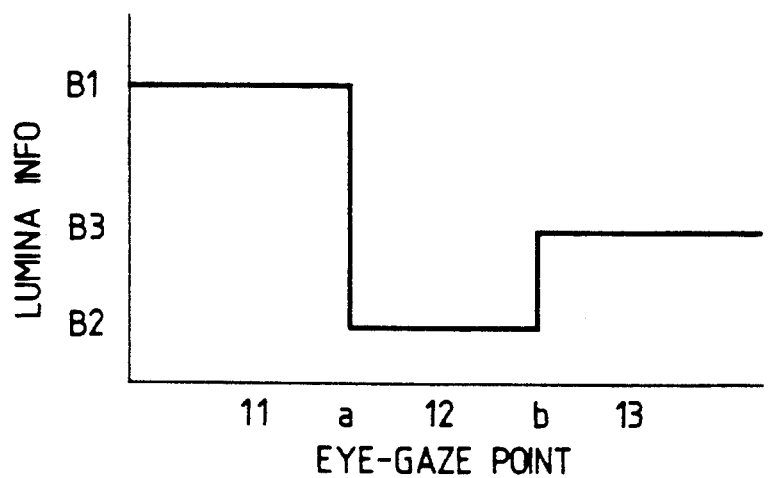
FIG. 11 is a graph showing the relation between the two particular eye-gaze points shown in FIG. 10 and object luminance information.
Figure 12:
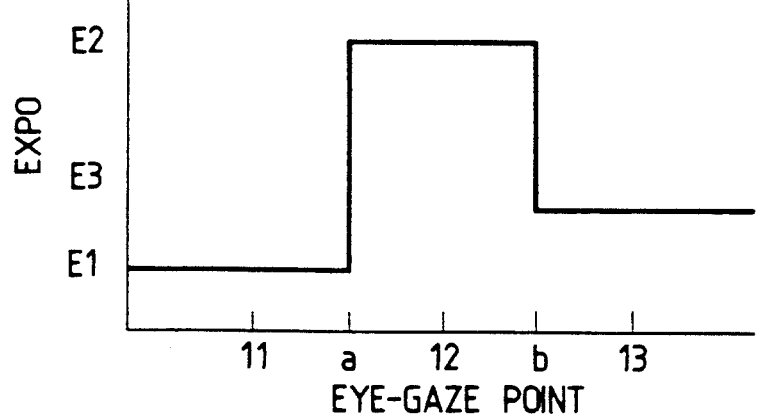
FIG. 12 is a graph showing the relation between the two particular eye-gaze points shown in FIG. 10 and the exposure amount.

Assuming for example that the eye-gaze point is at a point c indicated in the abscissa of FIG. 5, when the weighting coefficients k11-k13 for this eye-gaze point c are determined in accordance with the coefficient characteristic lines of FIG. 5, the are 0.65, 0.35 and 0, respectively, as shown in the ordinate of FIG. 5. Assuming that the information values B1-B3 representative of luminances in the photometry areas 11-13 differ greatly from one another as shown in FIG. 11, the mean information value B is as shown below.

$$B = (0.65 \times B1 + 0.35 \times B2 + 0 \times B3) \div (0.65 + 0.35 + 0)$$
$$\simeq 0.65 \times B1 + 0.35 \times B2$$

Figure 6:
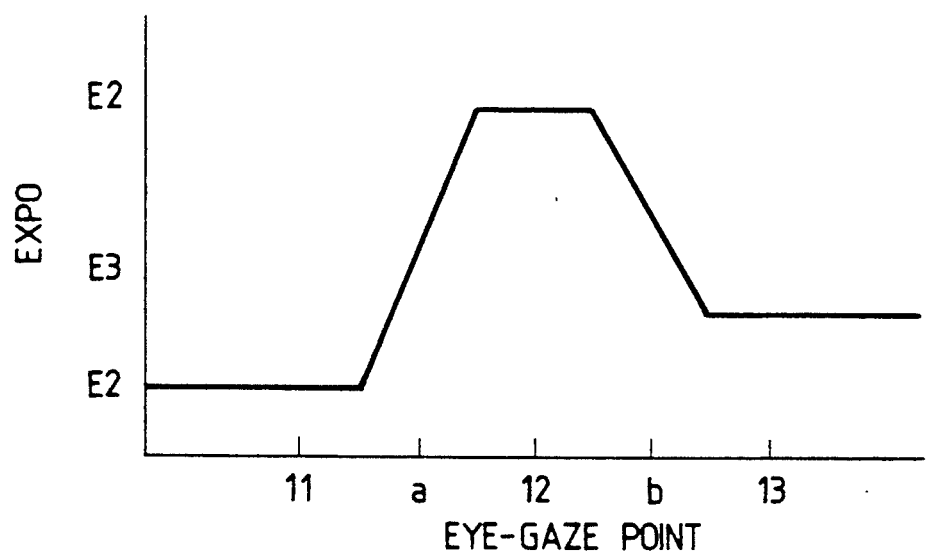
FIG. 6 is a graph showing the relation between the eye-gaze point and the exposure amount.

When the shutter speed of the shutter 35 and the amount of aperture of the stop 36 are controlled on the basis of the mean information value B obtained in this manner, the variation in the exposure amount at the boundary between the photometry areas will become smooth as shown in FIG. 6 even if the eye-gaze point changes delicately.

While the present embodiment has been described with respect to a case where there are three photometry areas, the present invention is not restricted thereto, but there may be two photometry areas or four or more photometry areas.

FIGS. 13 to 16 show a camera according to still another embodiment of the present invention. This camera effects automatic exposure on the basis of the result of eye-gaze detection.

The basic operation of the present embodiment will first be described with reference to FIG. 13. At the step 131 of FIG. 13, the gaze position of the photographer's eye looking into the finder is detected time-serially. Then at a step 132, the amount of eye-gaze at each photometry area (zone) is measured. On the other hand, at a step 133, the object luminance in each zone is measured. At a step 134, weighting based on the amount of eye-gaze at each zone obtained at the step 132 is effected to the object luminance at each zone obtained at the step 133. Finally at a step 135, a mean exposure value is calculated on the basis of the result of said weighting.

The construction of the present embodiment will now be described with reference to FIGS. 14 and 15.

Figure 14:
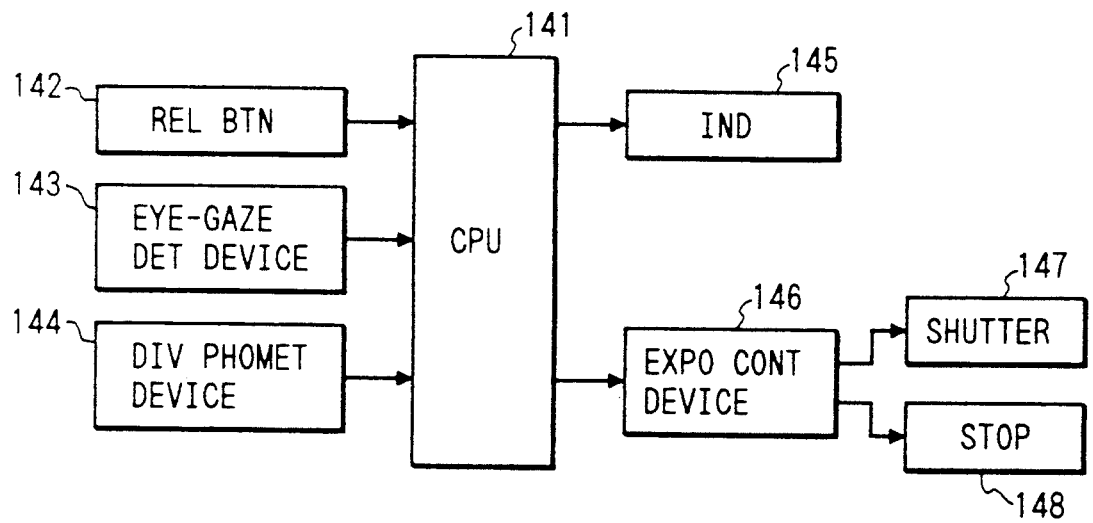
FIG. 14 is a block diagram of the FIG. 13 embodiment.

The exposure calculating device in this embodiment, as shown in FIG. 14, is comprised chiefly of a control unit (CPU) 141 for controlling the system of the camera, and the CPU 141 has connected thereto the outputs from a release button 142, an eye-gaze detecting device 143 and a divisional photometry device 144. The output of the CPU 141 is connected to an indicator 145 and an exposure control device 146.

Figure 15:
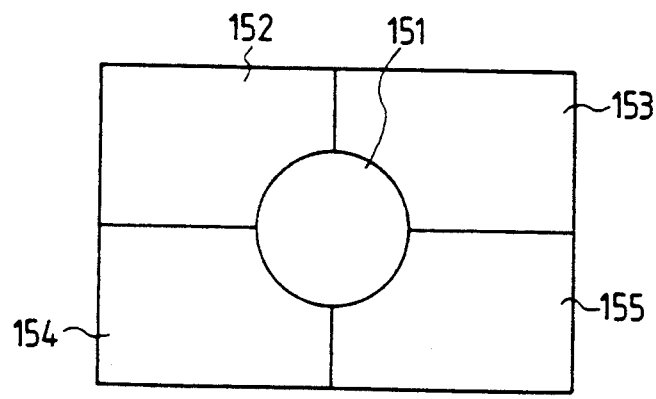
FIG. 15 shows the divided patterns of the photometry areas and eye-gaze detection areas in the photographing picture plane of the FIG. 13 embodiment.

Also, the eye-gaze detecting device 143 and the divisional photometry device 144, as shown in FIG. 15, divide the interior of the finder into five zones 151-155, i.e., the central portion, the top left portion, the top right portion, the bottom left portion and the bottom right portion, during photographing and effect eye-gaze detection and photometry, respectively, at each of the zones 151-155.

The release button 142 is provided on a camera body, not shown, and by the photographer depressing the release button 142, a signal for photographing direction or the like is output to the CPU 141.

The eye-gaze detecting device 143 is a device for detecting in which of the zones 151-155 the photographer's eye-gaze in the finder is positioned. As the eye-gaze detecting device 143, use can be made, for example, of a device which applies infrared illuminating light to the photographer's eye and detects the position of the eye-gaze by the reflected image from the cornea or the crystal lens (for example, the device disclosed in Japanese Laid-Open Patent Application No. 1-274736).

The divisional photometry device 144 is a device for measuring the object luminance in the finder at each of the zones 151-155 shown in FIG. 15, and it outputs the obtained luminance information to the CPU 141, which thus calculates the exposure value.

The indicator 145 is a device for indicating the eye-gaze point position detected by the eye-gaze detecting device 143 and the exposure value calculated by the CPU 141.

The exposure control device 146 is a device for controlling a shutter 147 and a stop 148 during photographing in conformity with the exposure value calculated by the CPU 141.

The process of the exposure value calculation effected in the CPU 141 will now be described with reference to FIG. 16.

Figure 13:
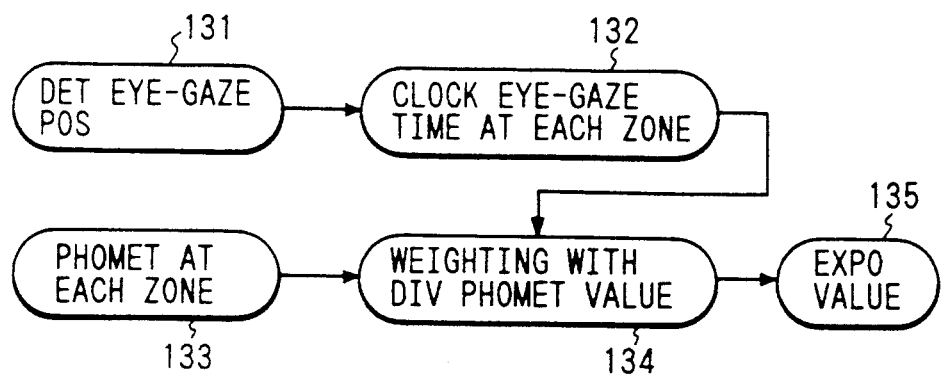
FIG. 13 is a conceptional diagram of still another embodiment of the present invention.
Figure 16B:
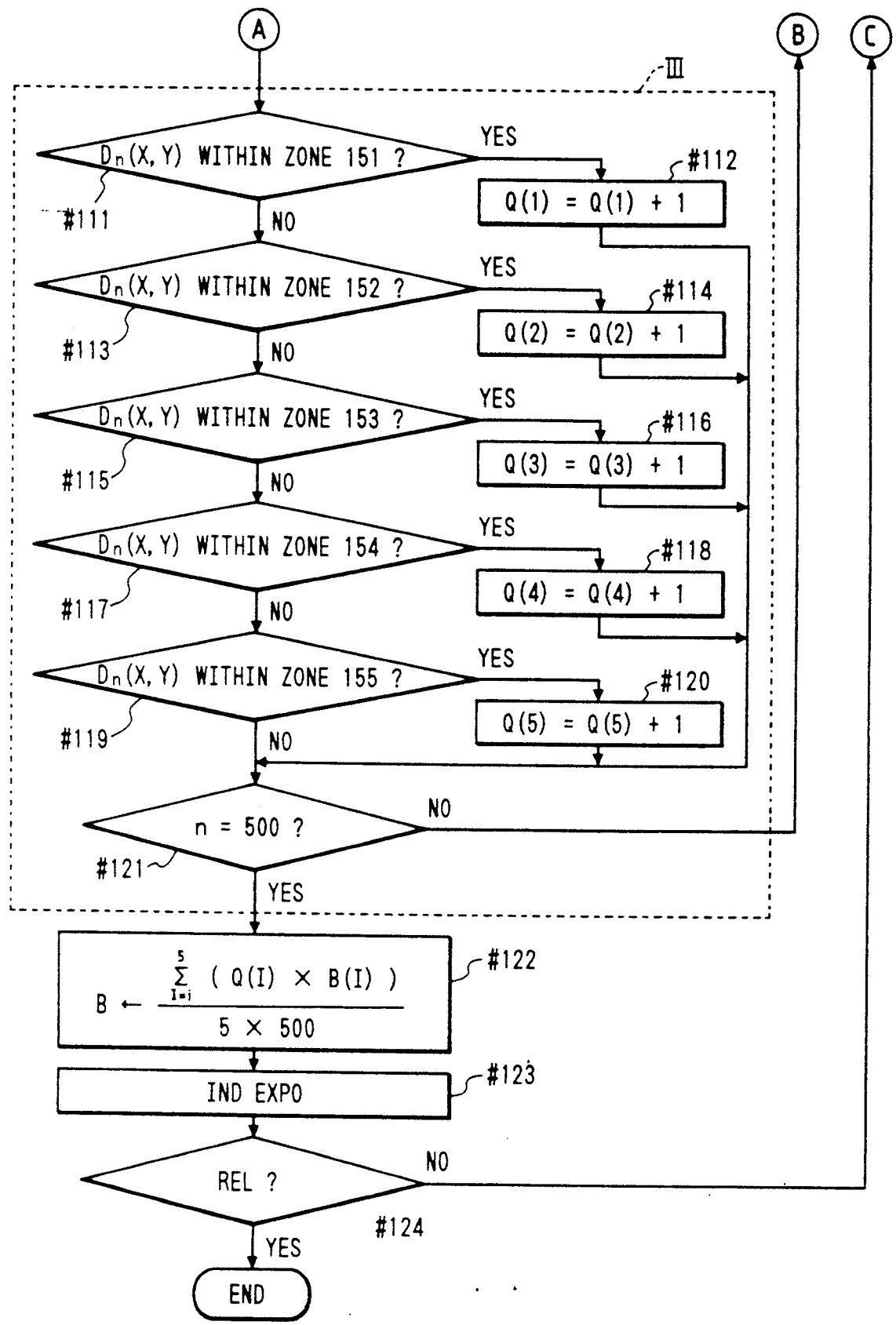
FIG. 16 is a flow chart showing the operation of a CPU in the FIG. 13 embodiment.

In FIG. 16, when the entire system of the camera is started, shift is made to an eye-gaze position detection block I comprising #100-#103 (this corresponds to the step 131 of FIG. 13).

n at #100 is a variable representative of the frequency of eye-gaze detection and is first set to 0. At #101, n+1 is substituted for n, and at #102, the first eye-gaze position detection is effected (this corresponds to the step 132 of FIG. 13). The photographer's eye-gaze position is represented by X-Y coordinates having the center of the finder as the origin, and the coordinates data is defined as Dn(X, Y).

Accordingly, by measuring these coordinates, which of the zones 151-155 in the finder the photographer's eye-gaze point is looking to can be detected.

In the present embodiment, the detection of the eye-gaze position is effected 500 times at intervals of 5 ms, and the routine of #102-#103 is executed until n reaches 500 times as shown at #103. When at #103, n reaches 500 times, shift is made to #104.

At #104, the divisional photometry device 144 measures the object luminance B(I)(1=1-5) at each of the five zones 151-155 (this corresponds to the step 133 of FIG. 13). Here, B(I) is a variable representative of the luminance of each of the zones 151-155, and I is a number indicative of the correspondence to the five zones, and 1-5 are allotted as I to the zones 151-155.

The block II comprising #105-#109 is a block for the eye-gaze detection after the aforedescribed 500 times of eye-gaze detection have been effected.

At #105, the 501st eye-gaze position detection is effected and the coordinates data thereof is defined as $D_{501}(X, Y)$. Then at #106, the first coordinates data $D_1(X, Y)$ is erased, whereby the renewal of data is effected and stored in the CPU 141.

107 and #108 perform operations similar to the aforedescribed #100 and #101, and #109 shows that as described previously in connection with #106, the coordinates data $D_{n+1}(X, Y)$ of the obtained eye-gaze position is replaced by coordinates data $D_n(X, Y)$.

In this manner, with the lapse of time, the coordinates data of the eye-gaze position are sequentially renewed to the newest data, and the number of the coordinates data are always kept at 500. Accordingly, even when much time is put in framing or the like, the coordinates data of the newest eye-gaze position is obtained.

Then, the eye-gaze frequency Q(I) for the five zones 151-155 is calculated from the obtained coordinates data of the eye-gaze position, and before that, at #110, Q(I) is set to the initial value 0. I is a number indicative of the correspondence to the five zones, and 1-5 are allotted as I to the zones 151-155.

Shift is then made to a block III for calculating the eye-gaze frequency for each zone. The block III comprises #111-#121, and is a block for discriminating which of the zones 151-155 the respective ones of the 500 coordinates data $D_n(X, Y)$ detected in the aforedescribed blocks I and II belong to.

At #111, whether the detected coordinates data $D_n(X, Y)$ are positioned in the zone 151 is discriminated. The coordinates which are the range of the zone 151 are preset, and by the coordinates data $D_n(X, Y)$ being compared with these set values, whether the coordinates data $D_n(X, Y)$ belong to the zone 151 is discriminated.

If at #111, it is judged that the coordinates data $D_n(X, Y)$ are positioned in the zone 151, advance is made to #112, where Q(1)+1 is substituted for Q(1), and shift is made to #121 which will be described later.

If at #111, it is judged that the coordinates data $D_n(X, Y)$ are not positioned in the zone 151, advance is made to #113. At #113, whether the coordinates data $D_n(X, Y)$ are positioned in the zone 152 is discriminated.

If at #113, it is judged that $D_n(X, Y)$ are positioned in the zone 152, advance is made to #114, where Q(2)+1 is substituted for Q(2), and shift is made to #121 as previously described, and if at #113, it is judged that $D_n(X, Y)$ are not positioned in the zone 152, advance is made to #115.

Similar operations are performed at #115, #117 and #119, and whether the coordinates data $D_n(X, Y)$ are positioned in the zone 152, the zone 154 and the zone 155, respectively, is discriminated.

If it is judged that the coordinates data $D_n(X, Y)$ belong to any one of the zones 153, 154 and 155, advance is made in succession to one of #116, #118 and #120, as in the case of #111 and #113. Then, Q(3)+1, Q(4)+1 and Q(5)+1 are substituted for Q(3), Q(4) and Q(5), respectively, whereafter advance is made to #121.

The routine of #111-#121 is repeated until as shown at #121, the frequency of eye-gaze detection reaches 500 times, and the frequency discriminated for each zone becomes the frequency Q(I) corresponding to the final zones 151-155.

As previously described, eye-gaze detection is effected at intervals 5 ms and thus, the value of Q(I) corresponds to the total time for which the zones 151-155 have been gazed at during a predetermined time. If at #121, n=500, shift is made to #122, where the block III ends.

At #122, on the basis of each eye-gaze time detected, weighting is effected to the exposure value B by the following equation (this corresponds to the steps 134 and 135 of FIG. 13).

$$B = \sum_{I=1}^{5} (Q(I) \times B(I))/5 \times 500$$

That is, each of Q(1)–Q(5) is divided by 500 to thereby find the proportion of eye-gaze times paid to the zones 151–155, and this proportion is multiplied by the object luminance B(I) for each zone measured at #104 to thereby find the arithmetic mean, and weighting is effected to the exposure value B. Therefore, the exposure value B is determined by the photographer's eye-gaze times to the zones 151–155, and the photographer's intention is sufficiently reflected upon exposure control.

After the calculation of the exposure value B, advance is made to #123, where the exposure value is indicated by the indicator 145 described in connection with FIG. 14. Further, when at #124, the photographer releases the shutter, the series of operations are terminated, and when the photographer does not release the shutter, return is made to #104.

The present invention is not restricted to the above-described embodiments, but various modifications are possible within the scope of the invention.

In the present embodiment, the shapes of the divided zones for effecting photometry and the divided zones for eye-gaze detection are the same, but they need not always be the same. For example, the divided zones for eye-gaze detection may be made narrower than the divided zones for photometry so as to be included in the divided zones for photometry. Also, the divided zones for photometry may be further subdivided than in FIG. 15.

Figure 22:
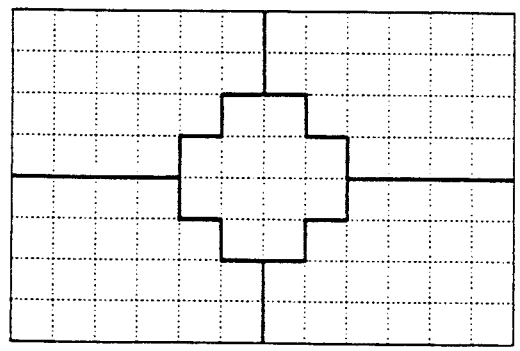
FIG. 22 shows an example in which the divided patterns of the eye-gaze detection areas of FIG. 15 have been changed.

FIG. 22 shows an example in which the eye-gaze detection areas are made narrower than the photometry areas. In FIG. 22, the eye-gaze detection areas comprise horizontally 12 divisions × vertically 8 divisions, totalling to 96 divisions. These eye-gaze detection areas, as indicated by thick lines in FIG. 22, are approximated to the divided shapes of the photometry areas 151–155 of FIG. 15 and are grouped for use for said weighting.

Figure 7:
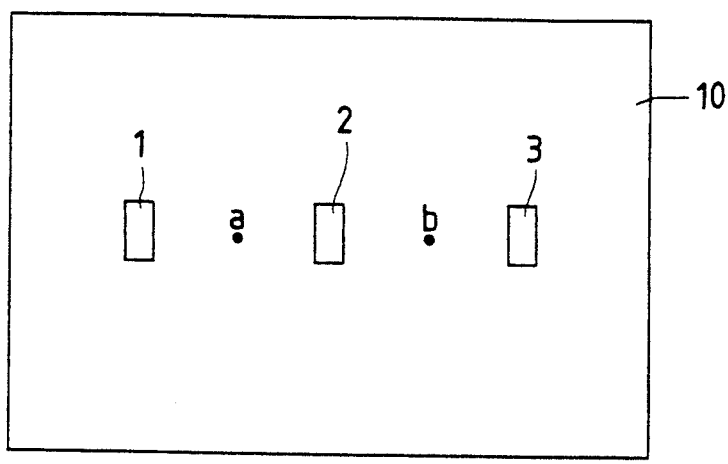
FIG. 7 shows the positions of focus detection areas and two particular eye-gaze points in the photographing picture plane.

If the eye-gaze detection areas are thus subdivided into a matrix form, the control as described in connection with FIGS. 5 and 6 will also become possible by using the result of the detection of the eye-gaze detection areas correspondingly to the focus detection areas differing in divided shape from the photometry areas 151–155, for example, the focus detection areas 1–3 of FIG. 7. If this is done, automatic exposure control and automatic focus adjustment can be accomplished on the basis of the output of a single eye-gaze detecting device and therefore, construction will become simple.

Also, the weighting of the exposure value B may be calculated by the use of the following equation, instead of the aforementioned equation.

$$B = \frac{\sum_{I=1}^{5} (Q(I)^2 \times B(I))}{5 \times \sum_{I=1}^{5} (Q(I)^2)}$$

When this equation this used, weighting to each photometric output is effected by the moment of the square of the eye-gaze continuation time and therefore, as compared with the case of #22, more importance can be attached to the areas which are gazed at for a long time.

Further, in the present embodiment, eye-gaze detection is effected at predetermined time (5 milliseconds) intervals and therefore, the result is the eye-gaze continuation time for each area within a predetermined time before photographing. However, this can also be said to be a frequency indicative of how many times of the predetermined times (500 times) of eye-gaze detection each area has been gazed. The present invention is not restricted thereto, but also covers counting a simple eye-gaze frequency (number of times) which does not take the time element into account.

Still another embodiment of the present invention is shown in FIGS. 17 to 21.

Figure 17:
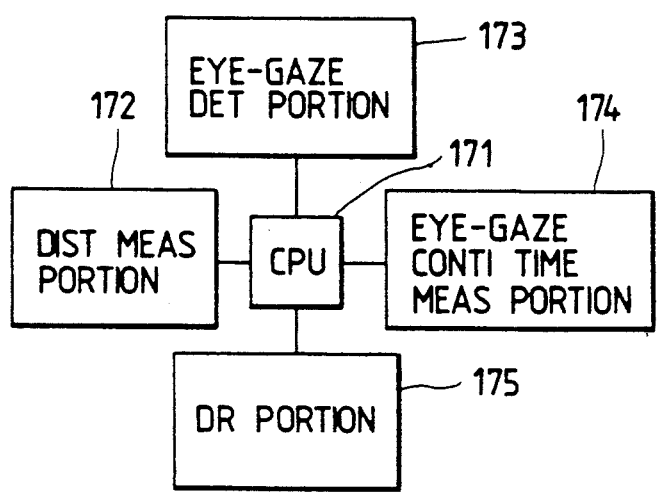
FIG. 17 is a block diagram of yet still another embodiment of the present invention.

FIG. 17 shows a block diagram of a camera according to the present embodiment, which is comprised of a CPU 171, a distance measuring portion 172, an eye-gaze detecting portion 173, an eye-gaze continuation time measuring portion 174 and a driving portion 175. The CPU 171 is a control device for effecting the various controls of the camera. The distance measuring portion 172 measures the object distances in distance measuring areas obtained by dividing the photographing picture plane. The eye-gaze detecting portion 173 detects which portion of eye-gaze detection areas obtained by dividing the photographing picture plane the photographer is gazing at. The eye-gaze continuation time measuring portion 174 includes a counter and measures the eye-gaze continuation time for each eye-gaze detection area detected by the eye-gaze detecting portion 173. The counter counts the clock pulses generated by the CPU 171 while a certain eye-gaze detection area is gazed at, and the CPU 171 stores therein this count number for each eye-gaze detection area. By reading this stored count number, the eye-gaze continuation time for each area can be found. The driving portion 175 is a driving device for driving the lens on the basis of distance information.

Figure 18A:
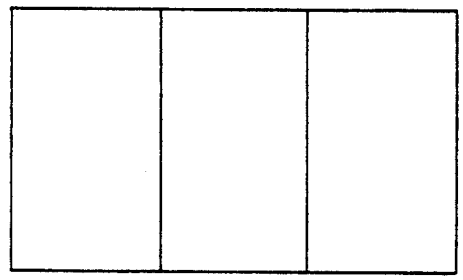
FIGS. 18A to 18C show the divided patterns of focus detection areas (distance measuring areas and eye-gaze detection areas in the photographing picture plane of the FIG. 17 embodiment.
Figure 18B:
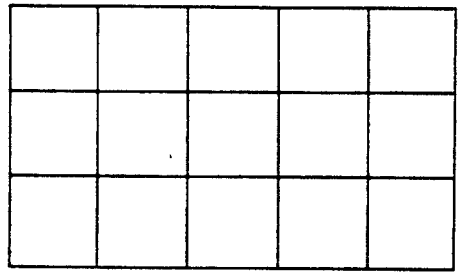
Figure 18C:
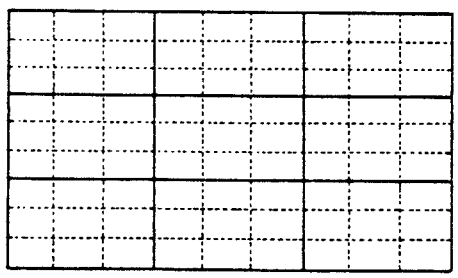

FIGS. 18A to 18C are illustrations showing the eye-gaze detection areas of the eye-gaze detecting portion 173 and the distance measuring areas of the distance measuring device for the photographing picture plane of the camera of the present embodiment. FIG. 18A shows an example in which the photographing picture plane is divided horizontally into three, and FIG. 18B shows an example in which the photographing picture plane is divided vertically into three and divided horizontally into five, thus being overall divided into fifteen. In FIG. 18C, areas partitioned by solid lines indicate distance measuring areas, and areas partitioned by broken lines indicate eye-gaze detection areas. In FIG. 18C, the distance measuring areas are provided by dividing the photographing picture plane both vertically and horizontally into three, thus into nine in total, and the eye-gaze detection areas indicate detection areas for the eye-gaze position provided by further dividing the distance measuring areas into nine, thus overall into eighty-one.

Of course, the detection areas of the distance measuring device and the detection areas for the eye-gaze position are not limited to those described above.

FIG. 19 is a flow chart showing the photographing operation of the camera of the present embodiment. This photographing operation is started by depressing the shutter release button.

At a step S1, photometry is effected and the photometric value is memorized.

At a step S2, the distance measurement of the individual distance measuring areas shown in FIG. 18 is effected by the distance measuring portion 172 and each distance measurement value is memorized.

At a step S3, the photographer's eye-gaze position is detected by the eye-gaze detecting portion 173. This detection is effected for a predetermined time (e.g. 1 second).

At a step S4, the eye-gaze continuation time detected at the step S3 is output by the eye-gaze continuation time measuring portion 174.

At a step S5, the photographing distance is determined with the eye-gaze continuation time at each eye-gaze detection area taken into account. This will be described later in greater detail.

At a step S6, the photo-taking lens is driven so as to be focused to the photographing distance determined at the step S5, whereafter exposure is effected on the basis of the photometric value obtained at the step S1, and post-exposure processes such as film advance and shutter charge are carried out, thus terminating the photographing operation.

FIG. 20 is a flow chart of a subroutine showing the substance of the process of determining the photographing distance to which the photo-taking lens is focused at the step S5.

At a step S10, from among the eye-gaze positions detected, eye-gaze positions of a predetermined eye-gaze continuation time $T_1$ (set to, e.g. $T_1 = 1/5$ T) or more are selected to the total time T (e.g. 1 second) for which the photographer gazes at the photographing picture plane.

At a step S11, the eye-gaze detection area $P_1$ of the longest eye-gaze continuation time is selected from among the eye-gaze positions selected at the step S10.

At a step S12, whether there is an eye-gaze detection area in which the difference from the eye-gaze continuation time for the eye-gaze detection area $P_1$ is within a predetermined value $t_1$ (set to, e.g. $t_1 = 1/20$ T) is judged, and if such an area is present, advance is made to a step S13, and if such an area is absent, advance is made to a step S14.

At the step S13, the distance measurement value of the distance measuring area corresponding to the eye-gaze detection area $P_1$ and the distance measurement value or values corresponding to one or more other eye-gaze detection areas for which the difference in eye-gaze continuation time from the eye-gaze detection area $P_1$ is within the predetermined value $t_1$ are compared with one another, whereby the information of the closest object distance is selected as the photographing distance.

At the step S14, whether one or more other eye-gaze detection areas for which the difference in eye-gaze continuation time from the eye-gaze detection area $P_1$ is within a predetermined value $t_2$ ($t_2 > t_1$, and set to, e.g. $t_2 = 1/10$ T) are present is judged, and if such area or areas are present, advance is made to a step S15, and if such area or areas are absent, advance is made to a step S16.

At the step S15, weighting mean conforming to the eye-gaze continuation time for each area is effected to the distance measurement value of the distance measuring area corresponding to the eye-gazed detection area $P_1$ and the distance measurement value or values corresponding to one or more other eye-gaze detection areas for which the difference in eye-gaze continuation time from the eye-gaze detection area $P_1$ is within the predetermined value $t_2$, and the result of it is adopted as the photographing distance.

At the step S16, the distance measurement value corresponding to the eye-gaze detection area $P_1$ is determined as the photographing distance. This is because the eye-gaze continuation time for the eye-gaze detection area $P_1$ is longer beyond the predetermined value $t_2$ than the eye-gaze continuation time for each of the other eye-gaze detection areas and therefore the eye-gaze detection area $P_1$ can be regarded as the main object on which the photo-taking lens should be focused.

Thereafter, return is made to the step S6 of FIG. 19.

Figure 21:
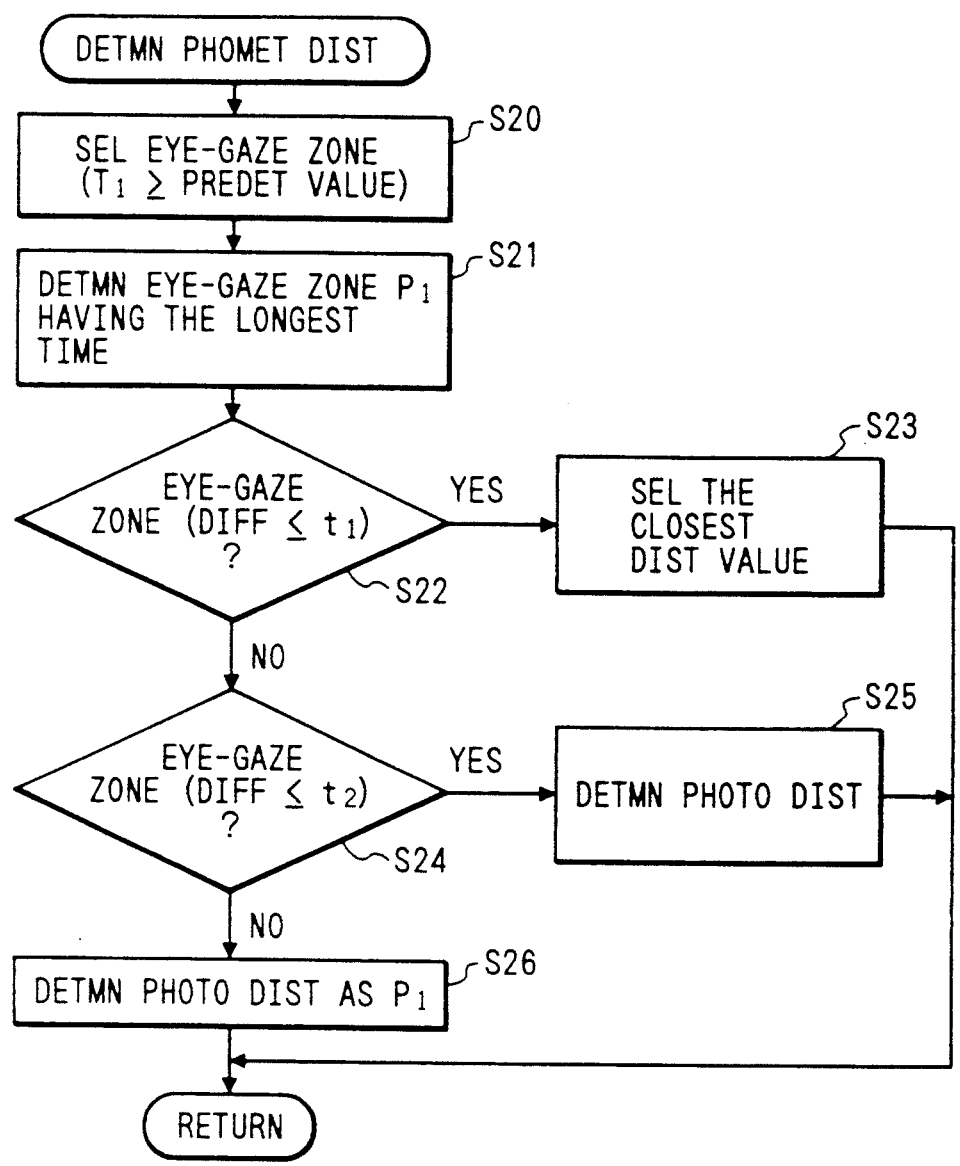
FIG. 21 is a flow chart showing another example of the subroutine of FIG. 19.

FIG. 21 is a flow chart of the subroutine showing another example of the process of the step S5 of the present embodiment.

Steps S20 to S24 are the same as the steps S10 to S14 of FIG. 20.

At a step S25, the photographing distance is set so that the photo-taking lens may be focused without fail on an object which is at the distance measurement value corresponding to the eye-gaze detection area $P_1$ and an object or objects corresponding to an object or objects which are at the distance measurement value or values of one or more other eye-gaze detection areas for which the difference in eye-gaze continuation time exceeds the predetermined value $t_1$ and is within the predetermined value $t_2$ may also be within the depth of field as far as possible. When the difference between the object distances is great, the depth of field is enlarged. This enlargement of the depth of field is accomplished by stopping down, but the amount of the stopping down is limited within a range in which under-exposure and the hand vibration by a reduction is shutter speed do not occur.

A step S26 and subsequent steps are the same as the step S16 and subsequent steps of FIG. 20.

Among the above-described embodiments, in the embodiments shown in FIGS. 18A and 18B and FIG. 22, as is apparent from these FIGURES, the ratio between the horizontal dimension and vertical dimension of each eye-gaze detection area is smaller than the ratio between the horizontal dimension and vertical dimension of the photographing picture plane. This shows that the resolving power in the vertical direction of eye-gaze detection is higher than the resolving power in the horizontal direction. Since the human eye moves more often in the horizontal direction than in the vertical direction, it is rational to make the resolving power in the horizontal direction of eye-gaze detection higher.

What is claimed is:

1. A camera including:
    a photo-taking lens;
    automatic focus adjusting means for effecting automatic focus adjustment of said photo-taking lens;
    eye-gaze detecting means for detecting a photographer's eye-gaze position in a finder field corresponding to a photographing picture plane, and producing an eye-gaze detection signal corresponding to said eye-gaze position;
    focus adjustment signal producing means for outputting a plurality of focus adjustment signals corresponding to a plurality of detection areas in said photographing picture plane; and
    control signal producing means for producing a control signal for controlling said automatic focus adjusting means on the basis of said eye-gaze detection signal and said plurality of focus adjustment signals corresponding to said plurality of detection areas when said eye-gaze postition indicated by said eye-gaze detection signal is at a position between said plurality of detection areas.

2. The camera of claim 1, wherein said control signal producing means includes calculating means which effects weighting attaching more importance to said focus adjustment signal of the detection area which is closer to said eye-gaze position, and produces said control signal according to said weighting.

3. A camera including:

a photo-taking lens;

photo-taking lens driving means electrically operable for driving said photo-taking lens;

eye-gaze detecting means for detecting a photographer's eye-gaze position in a finder field corresponding to a photographing picture plane, and producing an eye-gaze detection signal;

distance measurement signal producing means for outputting a plurality of distance measurement signals corresponding to a plurality of distance measuring areas in said photographing picture plane; and control signal producing means for producing a control signal for controlling said photo-taking lens driving means on the basis of said eye-gaze detection signal and said plurality of distance measurement signals corresponding to said plurality of distance measuring areas when said eye-gaze position indicated by said eye-gaze detection signal is at a position between said plurality of distance measuring areas.

4. The camera of claim 3, wherein said control signal producing means includes calculating means which effects weighting attaching more importance to said distance measurement signal of the distance measuring area which is closer to said eye-gaze position, and produces said control signal according to said weighting.

5. The camera of claim 3, wherein said photo-taking lens driving means effects focus adjustment of said photo-taking lens in response to said control signal.

6. The camera of claim 3, wherein said photo-taking lens driving means effects zooming of said photo-taking lens in response to said control signal.

* * * * *

UNITED STATES PATENT AND TRADEMARK OFFICE
CERTIFICATE OF CORRECTION

PATENT NO. : 5,333,029
DATED : July 26, 1994
INVENTOR(S) : Shigeyuki UCHIYAMA

It is certified that error appears in the above-identified patent and that said Letters Patent is hereby corrected as shown below:

On the Title Page:

In Item [19], "Uchiyama et al." should read --Uchiyama--;

In Item [75], the inventorship should read as follows: --Inventor: Shigeyuki Uchiyama, Tokyo, Japan--.

Signed and Sealed this

Fourteenth Day of November, 1995

Attest:

BRUCE LEHMAN

*Attesting Officer*     *Commissioner of Patents and Trademarks*